United States Patent [19]
Bruengger et al.

[11] Patent Number: 5,654,939
[45] Date of Patent: Aug. 5, 1997

[54] RETRIEVABLE VOLUMETRIC/PLANAR ACOUSTIC ARRAY APPARATUS

[75] Inventors: Craig V. Bruengger, Norwell; Thomas P. Bourgault, Duxburg; Richard R. Meyer, Norwell; Thomas J. Dunn, Plymouth, all of Mass.

[73] Assignee: Hazeltine Corporation, Greenlawn, N.Y.

[21] Appl. No.: 598,447

[22] Filed: Feb. 8, 1996

[51] Int. Cl.$^6$ ............................................. H04R 1/44
[52] U.S. Cl. ................................................. 367/153
[58] Field of Search .................................. 367/129, 153

[56]                  References Cited
              U.S. PATENT DOCUMENTS

| | | | |
|---|---|---|---|
| 3,944,964 | 3/1976 | Losser et al. | 367/4 |
| 4,298,964 | 11/1981 | Warnshuis, Jr. et al. | 367/153 |
| 4,637,490 | 1/1987 | Oxner | 367/154 |
| 5,056,065 | 10/1991 | Bruengger | 367/4 |

*Primary Examiner*—Ian J. Lobo
*Attorney, Agent, or Firm*—Edward A. Onders; William B. Ritchie

[57]                    ABSTRACT

A volumetric/planar array structure for detection of low frequency active pulses in shallow water. The structure is such that the array can be repeatedly deployed and retrieved. The invention utilizes folding array arms that are deployed at a pre-selected depth using only gravity once the release mechanism for deployment has been initiated. Rigid vertical support rods attach to all array levels preventing rotation down below the desired horizontal position during operation. Retraction of array arms for array structure retrieval is initiated by activating an electronic underwater release mechanism which then allows compliant rubber members to pull array arms in place. Once the array arms are in place, they are protected by a skid/crash cage fixture and the array structure is then ready for retrieval.

13 Claims, 6 Drawing Sheets

RETRIEVABLE VOLUMETRIC/PLANAR ACOUSTIC ARRAY APPARATUS

BACKGROUND OF THE INVENTION

1. Field of the Invention

The invention relates to large acoustic array structures.

2. Description of the Related Art

The use of acoustic arrays deployed below the water's surface has a variety of applications in both military and commercial fields. A commercial application consists of using such an array to receive reflected acoustic signals in oil exploration surveys. Submarine detection is the principle use in the military field. The size of these acoustic devices varies depending on the application. The greater the desired performance, the more electro-acoustic transducers required. When multiple electro-acoustic transducers are used, also known in the industry as hydrophones, they are usually positioned in either a vertical or horizontal line array. After deployment, a line array has the ability to listen in certain selected narrow beams which improves the signal to noise ratio so that longer detection ranges are achieved with improved discrimination.

Deployment of a typical line array is provided in U.S. Pat. No. 3,944,964, issued to Loeser et al. on Mar. 16, 1976. Loeser et al. discloses a self-deploying and self-aligning linear acoustic detector for providing advanced listening capability based on the ability of the detector to listen in selected acoustic beams.

U.S. Pat. No. 5,056,065, issued to Bruengger on Oct. 8, 1991, discloses another method for deploying a horizontal line array. This disclosure teaches a system for rapidly deploying a line array from a sonobouy and positioning of the array horizontally at a desired depth below the water's surface and in accordance with a predetermined time period.

Deployment of re-useable vertical or horizontal line arrays typical in the industry are easily handled and deployed on a ship because of their manageable size and weight. A re-useable array provides a greater utility since it can be used more than one time and at more than one location. For those devices that are not reusable, replacement costs become a consideration factor. An example of a non-reusable line array is the Loeser et al. acoustic detector, which is designed to be air dropped for quick reaction to a military threat. In this situation, rapid deployment over large distances is required without the need for a waterborne platform. But for those linear arrays that are reuseable, retraction from the water and easy storage on ships permits a feasible and cost effective approach in the acoustical detection of underwater signals.

While the use of re-usable linear and vertical arrays is desirable, it has been found that the management of these systems is limited to a particular size. Once the size of an array become too great, it becomes impractical to deploy and retrieve the array on board a ship. Of course, the size of the array also determines the number of hydrophones that can be effectively utilized using prior art designs. An array design having more than 150 hydrophones which can be stored in a compact fashion on a ship, then deployed and later retrieved for many cycles is not found in the prior art.

SUMMARY OF THE INVENTION

It is an aspect of the invention to provide a volumetric/planar array structure that can be easily deployed and retrieved from a ship.

It is another aspect of the invention to provide a volumetric/planar array structure that detects acoustical underwater signals.

It is another aspect of the invention to provide a volumetric/planar array structure that can be stored, deployed and retrieved in a compact size as compared to its operational size at full deployment.

It is another aspect of the invention to provide a volumetric/planar array structure that utilizes an automatic sequence for deployment and retrieval after placement in the water.

It is another aspect of the invention to provide a volumetric/planar array structure that minimizes the use of electro-mechanical devices to initiate deployment and retraction sequences.

It is another aspect of the invention to provide a volumetric/planar array structure that can be reused for many cycles.

It is another aspect of the invention to provide a volumetric/planar array structure that allows distribution of hydrophones to form high acoustic gain arrays.

It is another aspect of the invention to provide a volumetric/planar array structure without sacrificing personnel safety during handling on ship decks.

It is another aspect of the invention to provide a volumetric/planar array structure that utilizes a skid/crash cage structure for protection of the array arms when retracted.

It is another aspect of the invention to provide a volumetric/planar array structure that will withstand sea conditions of sea state 5.

It is another aspect of the invention to provide a volumetric/planar array structure that has a planar array positioned at the center of the structure.

It is another aspect of the invention to provide a volumetric/planar array structure that has a plurality of volumetric array layers.

It is another aspect of the invention to provide a volumetric/planar array structure that uses gravity deployment of the array arms.

It is another aspect of the invention to provide a volumetric/planar array structure that uses rubber tension members for retraction of the array arms.

It is a final aspect of the invention to provide a volumetric/planar array structure that utilizes automatic deployment at preset depths.

The invention is a volumetric/planar array structure having a center tube, a plurality of array arms attached to the center tube, a plurality of hydrophones attached to the plurality of array arms, means for controlling the deployment of the array arms at a preset depth, means for controlling the retraction of the array arms for array retrieval, and a skid/crash cage for protection of the array arms while in storage.

The retraction of the array arms for the retrieval of the volumetric/planar array is accomplished by a plurality of guy wire supports connected to the array arms and a plastic shuttle. A plurality of rubber compliant members stretched from the plastic shuttle oppose the guy wires. When the plastic shuttle is released by the underwater electronic release mechanism, the shuttle moves within the center tube and causes the rubber compliant members to contract and pull the guy wire supports into the center tube, further pulling the array arms to provide a retracted position.

The release of the array arms for the deployment of the volumetric/planar array requires a retaining cable for holding the support arms in place until deployment and a pressure release mechanism that is automatically activated at a pre-selected water depth. Once activated, the hydrostatic sensitive release mechanism allows retaining cable to drift away allowing gravity to force the array arms to their operational position.

Further aspects and advantages of this invention will become apparent from a consideration of the drawings and ensuing descriptions.

DETAILED DESCRIPTION OF THE INVENTION

Figure 1:
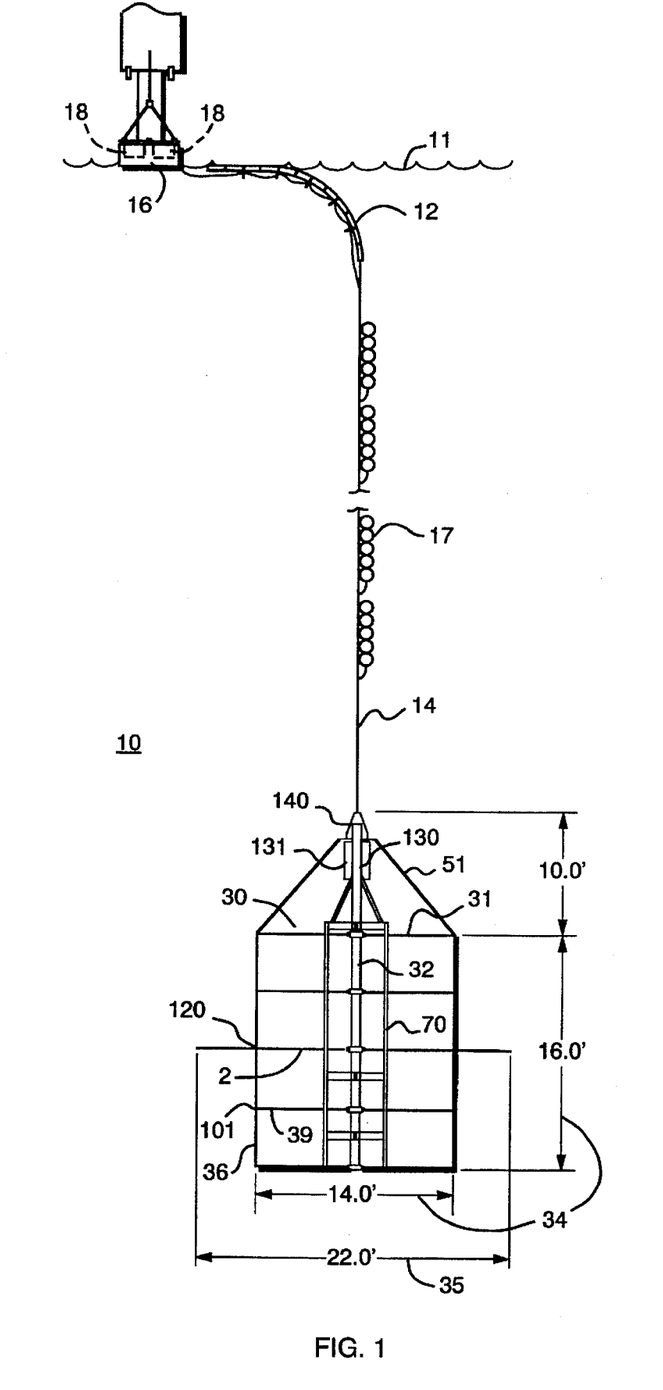
FIG. 1 is an operational view of the volumetric/planar array structure in its deployed state.
Figure 1A:
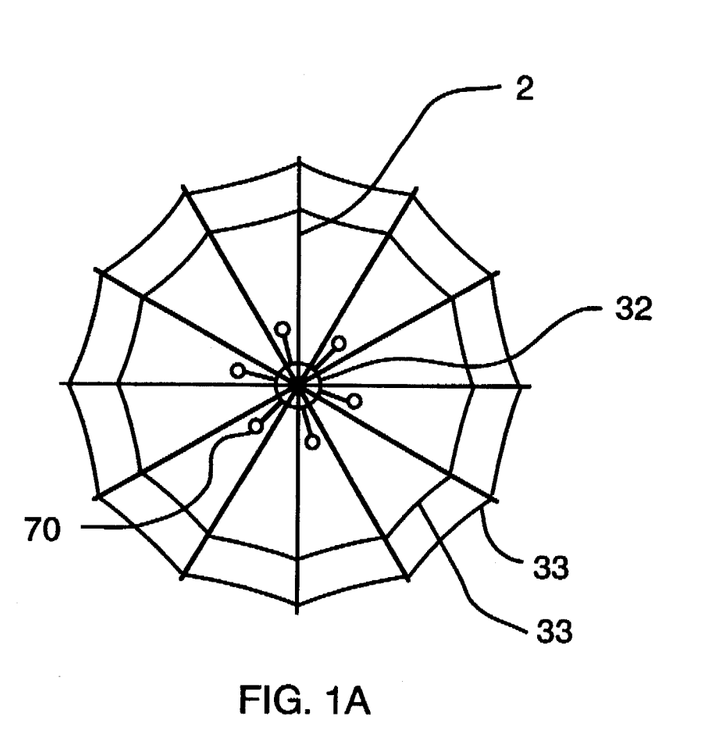
FIG. 1A is a top view of the planar array arms in their deployed state.

An improvement in acoustical performance over that of typical linear arrays can be achieved with the invention which is a volumetric/planar array. FIGS. 1 and 1A show volumetric/planar array structure 10 in its deployed state.

Utilization of volumetric/planar array structure 10 is more effective than linear and vertical arrays for detection of low frequency active pulses in shallow water. Surface float 16 contains two transmitters 18 to separately transmit volumetric and planar array data as well as a receiver 18 to allow the automatic gain control (AGC) update rate in the array lower electronics 130 to be adjusted. Data relayed from surface float 16 to a data gathering ship (not shown) or aircraft (not shown) is fed into a Demux/Beamformer which allows the operator to view individual volumetric beamformed staves, performed beam outputs, individual planar hydrophone outputs, as well as AGC, depth, tilt and compass data; which all contribute to an increased level of performance over linear arrays. The electronics involved to support apparatus 10 are well known in the art.

Volumetric/planar array structure 10, which is representative of a typical application, weighs in excess of 1400 pounds and utilizes the placement of one hundred ninety-eight hydrophones 30 on four levels of array arms 31 and a single level of array, arms 2. Other sizes, either larger or smaller would be scaled accordingly using the principles described herein. The four level of array arms 31 form a 14 foot diameter by 16 foot long volumetric array 34 and the single layer of array arms 2 form a 22 foot diameter planar array 35, as will be described in more detail within the following paragraphs. Hydrophones 31 from the single layer of planar array 35 are also used to form the volumetric array 34.

Due to the large diameter and weight of volumetric/planar array structure 10, a special system for storage, deployment and retrieval is necessary in order to provide a compact size as compared to its operational size at full deployment. A compact size makes it easier to handle apparatus 10 without damaging any of the array components, which in turn allows apparatus 10 to be reused many cycles. Additional concerns for a structure of this size are breakage during transit and the potential for injury to personnel during handling.

Apparatus 10 can be configured in a variety of operational sizes utilizing variations in the number of hydrophones 30 and the number of array arms 2 and 31 selected to form the volumetric 34 and planar 35 arrays. The special system depicted by this invention for storage, deployment and retrieval can be directly applied to these variety of operational sizes without any significant deviations from the system presented for apparatus 10. In its operational state, volumetric/planar array structure 10 is a free-drifting system suspended from the water's surface 11 with an electro-mechanical uplink cable 14 that is secured by surface float 16. The other end of cable 14 is securely attached to plate 140.

Figure 2:
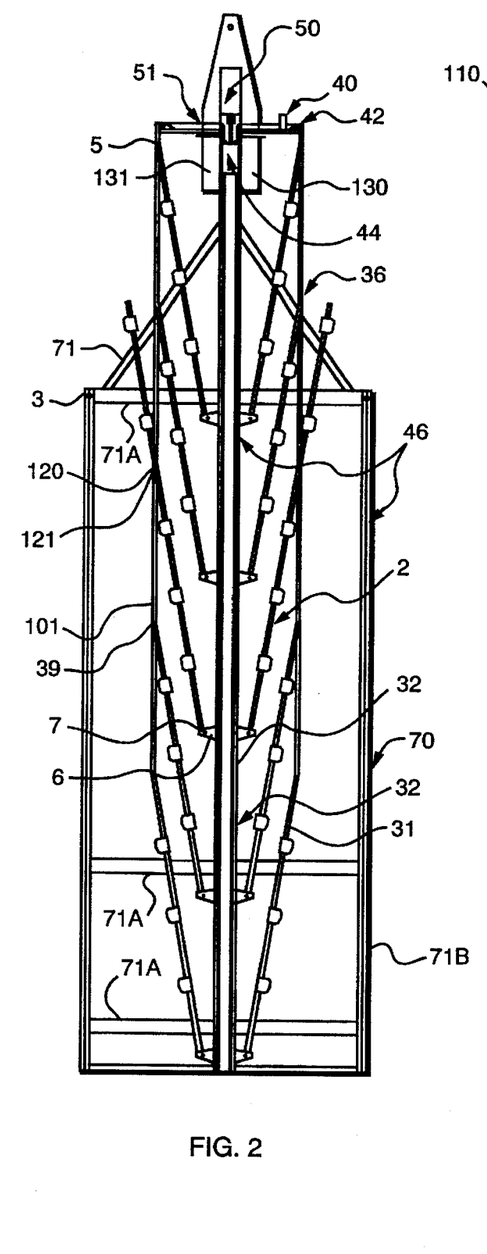
FIG. 2 is a view of the volumetric/planar array structure armed for deployment.
Figure 2A:
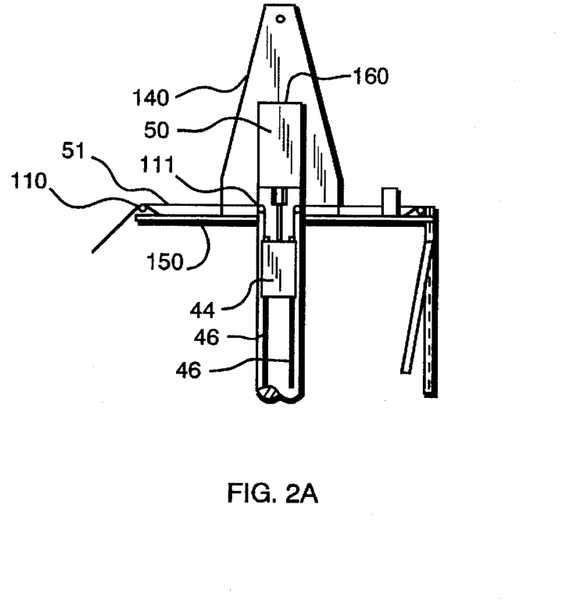
FIG. 2A is detailed view of the top of the array structure.

Referring now to FIGS. 2 and 2A, apparatus 10 is hoisted using cable 14. The material used for plate 140 is not critical as long as the material is sufficiently strong. Aluminum is preferable for plate 140 due to weight considerations. Plate 140 must be of a sufficient height to allow clearance of center tube extension 160. Access to the contents of center tube extension 160 is also permitable while plate 140 is in place on collar 150. Methods standard in the art are acceptable for securing plate 140 to center support tube 32. Plate 140 is attached to center tube extension 160 and center tube extension 160 is bolted to center support tube 32. Collar 150 is bolted to plate 140. Attachment of aluminum collar 150 to center tube 32 is accomplished by bolting the two together.

Collar 150 has an inner diameter corresponding in size to the outside diameter of center support tube 32. The outside diameter of collar 150 is selected to form a ninety degree angle with rigid support rods 36 when array arms 31 are in a retracted position. Other methods standard in the art would be acceptable for securing collar 150 to center support tube 32.

Both surface float 16 and electro-mechanical uplink cable 14 are typical of those in the industry. Surface float 16 receives via electro-mechanical uplink cable 14 acoustical signals detected by volumetric/planar array structure 10. Radio frequency (RF) transmitters 18 housed within surface float 16 relay the signals to a data gathering receiver located on a ship (not shown) or aircraft (not shown). Flexible surface spar flotation 12 is attached to surface float 16 and electro-mechanical uplink cable 14. Electro-mechanical uplink cable 14 is covered over its entire length with a plurality of subsurface flotation devices 17. This configuration, standard in the industry for obtaining surface motion decoupling, permits volumetric/planar array structure 10 to operate through sea state 5. This method replaces a typical rubber decoupling device commonly used in the industry and allows easier deployment and recovery.

Volumetric/planar array structure 10 is covered by a plurality of spatially located analog hydrophones 30, which are well known in the art. Hydrophones 30 total one hundred ninety-eight in count and are positioned on five layers of carbon fiber tubular arms 31 to form volumetric array 34 and on one layer of carbon fiber tubular arms 2 to form planar array 35.

Array arms 2 and 31 are attached to center support tube 32 via hinge members 6. Hinge members 6 are bolted to center support tube 32 and are positioned according to the desired location of array arms 2 and 31. There are a total of twelve hinge members 6 per layer, one for each individual array arm 2 and 31. Pin 7 is inserted through a hole (not shown) to align support rod 36 and hinge member 6. The hole corresponds in size to the diameter of pin 7. Once inserted through the hole (not shown), pin 7 is secured in place by a retaining clip (not shown). Connection of array arms 2 and 31 to center support tube 32 allow for an unrestricted movement about hinge member 6 in order to support the deployment and retrieval process. Center support tube 32 is a hollow structure, constructed from aluminum material. Aluminum is the preferred material for construction of center support tube, but steel or other strong materials could be utilized.

Using twelve separate array arms 31 for each of the four layers, a fourteen foot diameter by sixteen foot long volumetric array 34 is formed. In a similar manner, twelve separate array arms 2 form a single layer twenty-two foot diameter planar array 35 that is centrally located among volumetric array 34.

FIG. 1A is a top view of planar array 35 illustrating the twelve array arms 2 attached to center support tube 32. Connection and positioning of array arms 31 to center support tube 32 are also accomplished in an identical fashion. As shown in FIG. 1A, only planar array 35 has tension members 33 to support outer hydrophones 30. This is due to array arms 2 being longer in length to array arms 31. Tension members 33 are individual sections of rubber tubing the same diameter as array arms 31. The rubber tubing flexes when array arms 31 are folded up.

Array arms 2 and 31 are perpendicular to center support tube 32 when fully deployed. Twelve rigid vertical support rods 36 are attached to outer perimeter points 39; one support rod 36 for each vertical alignment of array arms 31. Rigid support rod 36 is also attached to array arm 2 at point 120 within the same vertical alignment of array arms 31.

Connection of support rods 36 to endpoints 39 are accomplished via pin 101 inserted through a hole (not shown) to align outer perimeter point 39 and vertical support rod 36. The hole corresponds in size to the diameter of pin 101. Once inserted through the hole (not shown), pin 101 is secured in place by a retaining clip (not shown). The preferable material for the vertical support rods 36 is carbon fiber. An unrestricted movement between array arms 31 and vertical support rods 36 is required in order to permit movement of support rods 36 during the deployment and retrieval process.

In a similar manner, connection of support rods 36 to array arms 2 are accomplished via pin 121 inserted through a hole (not shown) in array arm 2 and vertical support rod 36 to align the two together. The hole corresponds in size to the diameter of pin 121. Once inserted through the hole (not shown), pin 121 is secured in place by a retaining clip (not shown). An unrestricted movement between array arms 2 and vertical support rods 36 is likewise required in order to permit movement of support rods 36 during the deployment and retrieval process.

FIG. 2 is a view of volumetric/planar array structure 10 prepared for deployment. Guy wire 51, which is made up of twisted steel cables, has one end captured within tip 75 (shown in detail FIG. 3) of the vertical support rods 36. This prevents rotation of array arms 2 and 31 down below the desired horizontal position during operation. There are a total of twelve guy wires 51, one for each vertical rod 36. The other end of guy wire 51 is routed over rollers 110 and 111 for attachment to plastic shuttle 44. Rollers 110 and 111 are well known in the art and are used to facilitate movement of array arms 2 and 31 during the deployment and retrieval process. Prior to deployment, guy wires 51 are stored within tip 75 of the vertical support rods 36.

Inside hollow array center support tube 32 is plastic shuttle 44. Outside diameter of cylindrical plastic shuttle 44 corresponds in size to the inside diameter of support tube 32. Attached to plastic shuttle 44 are twelve prestretched compliant rubber members 46, which run from plastic shuttle 44 down through array center tube 32 and through the inside of array protective crash cage 70. Termination is made at point 3 within crash cage 70. The preferable type of rubber to be used for members 46 is latex rubber with braided nylon jacket ⅜" diameter. Rubber members 46 are prestretched to 20–25 lbs. tension.

Protective crash cage 70 surrounds array center support tube 32 in a star like fashion, as illustrated in FIG. 1A. Protection of array arms 2 and 31 and array center tube 32 is accomplished when apparatus 10 is stored. Crash cage 70 is made up of 6 outer aluminum tubes 71b, preferably constructed of aluminum. Crash cage supports 71 are bolted to top supports 71A and support tube 32. Supports 71A are bolted to crash cage tubes 71B and to center support tube 32 in order to strengthen impact protection against center support tube 32. While volumetric/planar array structure 10 is in the armed for deployment position, array arms 2 and 31 are held in a position approximately parallel to hollow array center tube 32. In this position, array arms 2 and 31 are on the inside of protective crash cage 70.

Figure 3:
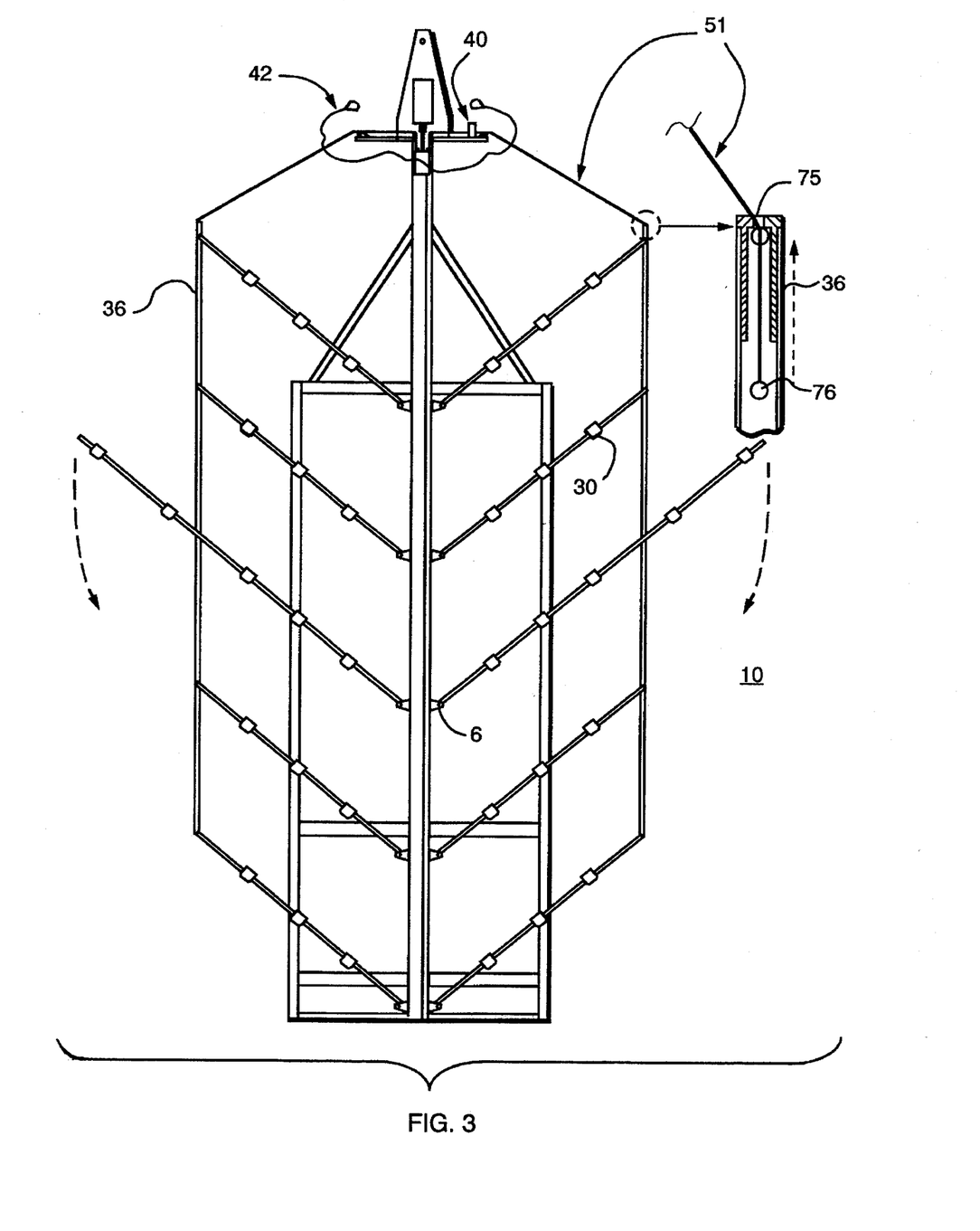
FIG. 3 is a view of the volumetric/planar array structure in the process of deploying to its operating position.

FIG. 3 is a view of volumetric/planar array structure 10 in the process of deploying. Prior to deployment, retaining cable 42 surrounds all the vertical support arms 36 to prevent deployment during shipboard handling. Retaining cable 42 is a small gauge steel cable of sufficient strength to retain support rods 36 in place. Release of retaining cable 42 is controlled by pressure release mechanism 40. Pressure release mechanism 40 activates at a depth that is preset prior to submerging volumetric/planar array structure 10. Upon activation, pressure release mechanism 40 simultaneously releases both ends of retaining cable 42, thus making it expendable. Once released, retaining cable 42 floats away and no longer maintains a force on vertical support rods 36. As a result of the removal of retaining cable 42, gravity allows array arms 2 and 31 to pivot on hinge extension 6 to a position that is substantially perpendicular to array center support tube 32. Each vertical support rod 36 moves with array arms 2 and 31 during rotation. While vertical support rods 36 are moving, guy wires 51 feed out of their initial position within tip 75 of the vertical support rods 36. When array arms 31 are approximately perpendicular with array center tube 32, guy wire support ends 76 can no longer fit through opening 75 in support rods 36, thus causing array arms 2 and 31 to cease rotating. Tip 76 of cable 51 is crimped with a spherical end fitting installed at the end so that support ends 76 will not penetrate opening 75.

Once array arms 2 and 31 come to rest, apparatus 10 is ready to detect acoustic signals from the water, process those signals and then transmit the signals to ships or planes for analysis. The detected array analog hydrophone signals are fed through cabling (not shown) which runs from each array arm 2 and 31 into electronics package 130. The components of electronics package 130 are standard in the industry. The received signals are then filtered and digitized before being relayed to RF electronics package 18 housed within surface float 16. Electronics package 130 includes automatic gain control, as well as compass, tilt, and depth sensor information, which are also relayed. A rechargeable battery pack 131 located adjacent to array electronics package 130 supplies power to the array and electronics.

Figure 4:
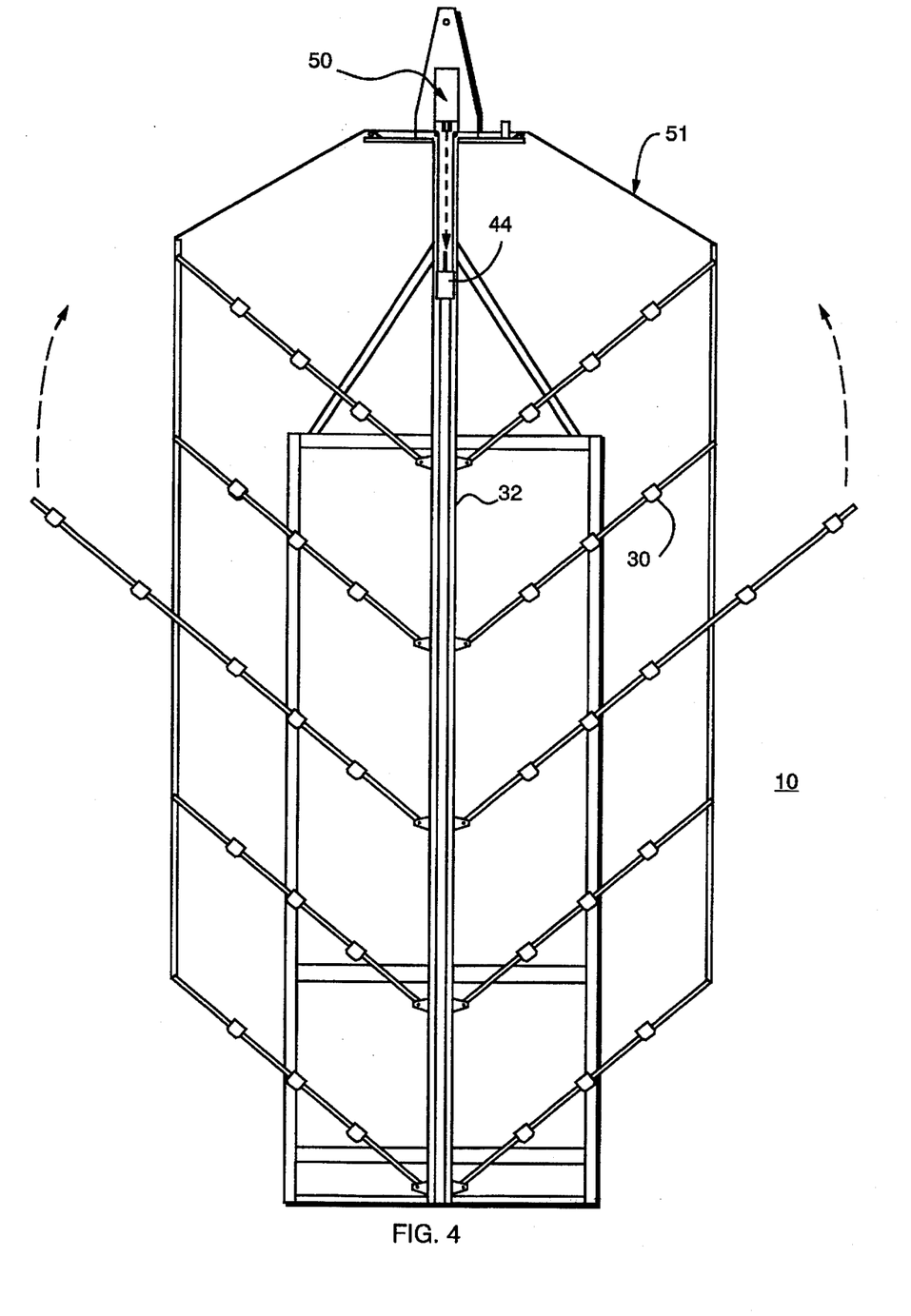
FIG. 4 is a view of the volumetric/planar array structure in the retrieval process.

FIG. 4 is a view of volumetric/planar array structure 10 in the process of retracting after deployment. Surface float 16 is retrieved and electro-mechanical uplink cable 14 is then attached to a winch (not shown). An electronics module [not shown] is attached to electro-mechanical uplink cable 14 to activate electric release mechanism 50. Upon activation of electric release mechanism 50, plastic shuttle 44 is released and is pulled by the rubber compliant members 46 down center support tube 32. The release is a motor driven device which releases a retaining catch when activated. As plastic shuttle 44 moves through hollow array center support tube 32, compliant rubber members 46 contract. The contraction pulls guy wire 51 into array center support tube 32. As guy wires 51 are pulled further into array center support tube 32, they cause vertical support rods 36 to move closer to array center support tube 32. The movement of vertical support rods 36 pulls up array arms 2 and 31 and causes them to pivot about hinge extension 6. When plastic shuttle 44 ceases to move within array center tube 32, array arms 31 will be in a position nearly parallel to array center tube 32.

Figure 5:
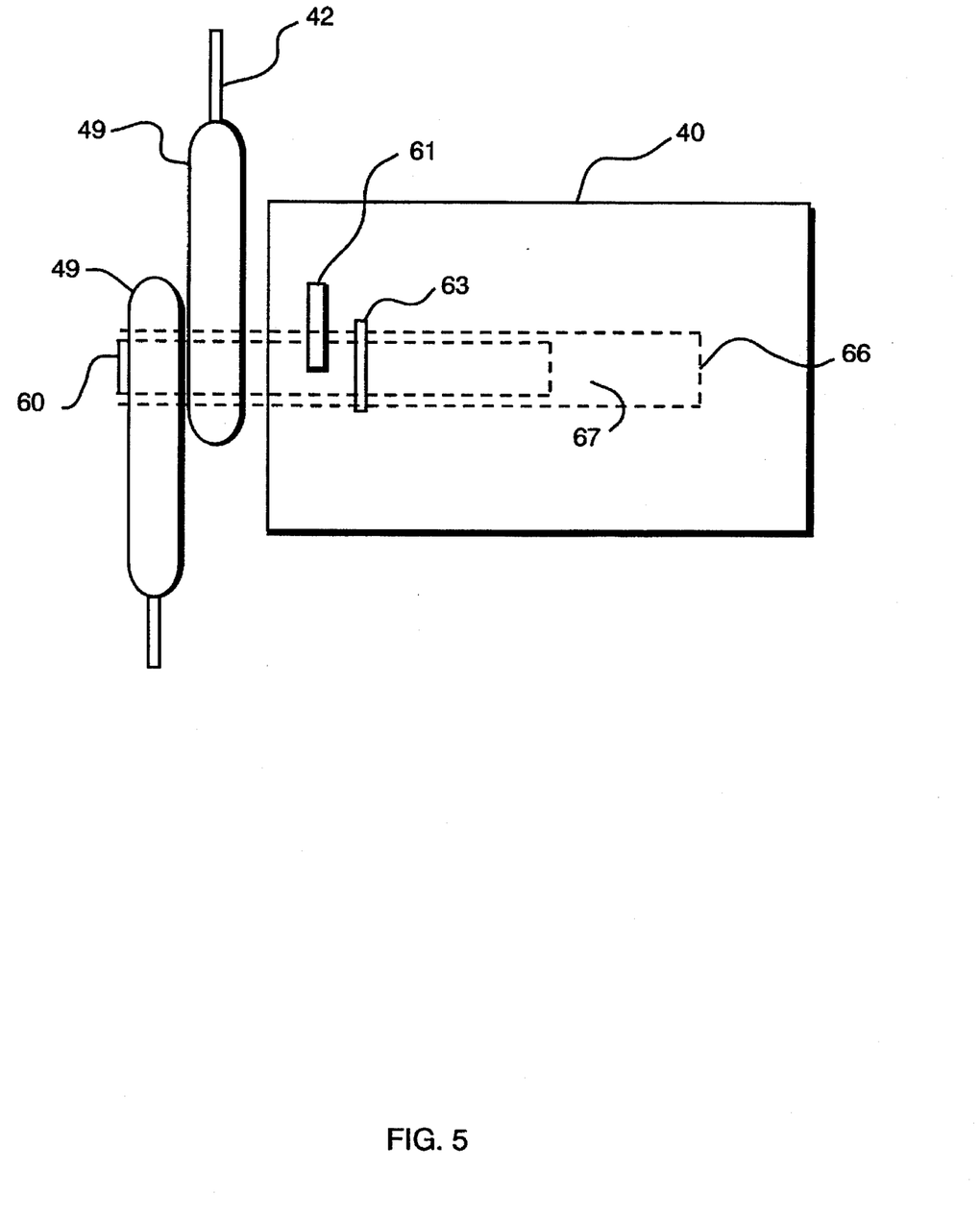
FIG. 5 is a diagram of the pressure release mechanism used for deployment of the array arms at preset depths.

FIG. 5 is a view of pressure release mechanism 40 used for initiating deployment of volumetric/planar array structure 10 at a preset depth. Pressure release mechanism 40 is typical of those in the industry and consists of hydrostatic piston 60, o-ring 63 and cylinder 66, which allows for the movement of piston 60. Retaining cable termination ends 49 of retaining cable 42 are held at an equal distance from the cylinder opening. Cylinder 66 is sized such that piston 60 can retract to a position where the ends of retaining cable termination ends 49 are released. O-ring 63 covers an area from the outside of piston 60 to the inside walls of cylinder 66. O-ring 63 creates a barrier between either side of piston 60 within cylinder 66. The barrier is such that the side of piston 60 closest to retaining cable 42 can fill with water. The other side of piston 60 closest to the bottom of cylinder 66 does not allow water to enter cylinder 66, thus making it air filled.

Retaining cable 42 is expended during deployment and replaced for subsequent missions. The mechanism works as follows. Retaining cable termination ends 49 are held in a fixed position by piston 60 while not in the water. As apparatus 10 is lowered into the water, hydrostatic pressure acting on piston 60 pushes farther into the air filled portion 67 of cylinder 66. As piston 60 moves further back into the air filled portion 67, it contacts the surface of cylinder 66 and releases the retaining cable termination ends 49. This process allows the array to deploy. Different depths can be achieved by installing shear pins 61 (shown in FIG. 5) which engage with piston 60 and cylinder 66 and which break at predetermined depths based on the number of pins used.

While there has been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A volumetric/planar array structure comprising:
   a center tube;
   a plurality of array arms pivotally and radially attached to said center tube, each of said array arms having a plurality of hydrophones, said plurality of array arms forming a first horizontal set;
   a shuttle having a resilient end and a cable end, said shuttle positioned within said center tube;
   at least one resilient member having a fixed end and shuttle end, said resilient member being connected to said shuttle at its resilient end and its fixed being rigidly attached to said array structure such that said resilient member is tensioned by a predetermined amount;
   a plurality of guy wires, one guy wire for each array arm, each of said wires having a shuttle end, an arm end and a predetermined length, said guy wire connected to said arm at said arm end and connected to said shuttle at said shuttle end;
   means for holding said array arms approximately parallel to said center tube to provide a deployment position until a predetermined pressure is reached; wherein attainment of said pressure causes said means for holding to free said arms, thus deploying said arms under the force of gravity until said arms are approximately at a right angle to said center tube and said guy wires are fully extended;
   means for releasing said plastic shuttle in response to a signal; wherein said means for releasing receives said signal, said shuttle is released causing said shuttle to move within said center tube under the contractive force provided by said resilient members, thus retracting said arms until said arms are again approximately parallel to said center tube to again provide said deployment position.

2. The volumetric/planar array structure of claim 1 further comprising a second horizontal set of array arms, with the number of array arms in said second horizontal set being identical to the number of array arms in said first horizontal set, each array arm of said first horizontal set being vertically aligned with an array arm from said second horizontal set and connected to one another via a vertical support rod.

3. The volumetric/planar array structure of claim 3 further comprising at least one additional set of array arms substantially identical to said first and second horizontal set and connected to said first and second horizontal sets via said support rods.

4. The volumetric/planar array structure of claim 2 wherein one horizontal set of array arms has at least some of said array arms being substantially longer than said array arms of the other horizontal set of array arms.

5. The volumetric/planar array structure of claim 1 further comprising: a surface float having at least one transmitter and receiver for transmitting and receiving data; a hoisting plate connected to said center tube, an electro-mechanical uplink cable connected from said surface float to said array structure via said hoisting plate.

6. The volumetric/planar array structure of claim 5 wherein said electro-mechanical uplink cable has a plurality of subsurface flotation members attached thereto.

7. The volumetric/planar array structure of claim 1 further comprising a plurality of tension members-connected between adjacent array arms of said first horizontal set.

8. The volumetric/planar array structure of claim 7 wherein said tension members are individual sections of rubber tubing having substantially the same diameter as said array arms.

9. The volumetric/planar array structure of claim 2 wherein each arm end of each guy wire for each said arm is positioned within its corresponding vertical rod.

10. The volumetric/planar array structure of claim 5 further comprising a protective crash cage connected to said hoisting plate and said center tube.

11. The volumetric/planar array structure of claim 10 wherein the fixed end of said resilient member is fastened within said protective crash cage.

12. The volumetric/planar array structure of claim 10 wherein said protective crash cage comprises a plurality of outer tubes, extending radially from said center tube in order to strengthen impact protection for said center tube.

13. The volumetric/planar array structure of claim 1 wherein said means for holding said array arms further comprises a hydrostatic piston, an o-ring circumferentially attached to said piston, said piston slidably positioned within a cylinder, a retaining cable having termination ends held by said piston, wherein said cylinder is sized such that said piston can retract to a position where the termination ends of said retaining cable are released when hydrostatic pressure acting on said piston pushes said piston farther into said cylinder.

* * * * *